United States Patent
Fukuzaki et al.

(10) Patent No.: US 9,030,929 B2
(45) Date of Patent: May 12, 2015

(54) REDUNDANT CONTROL DEVICE AND NETWORK SYSTEM

(71) Applicant: ALAXALA Networks Corporation, Kawasaki-shi, Kanagawa (JP)

(72) Inventors: Shohei Fukuzaki, Tokyo (JP); Ken Watanabe, Yokohama (JP)

(73) Assignee: ALAXALA Networks Corporation, Kawasaki-shi (JP)

( * ) Notice: Subject to any disclaimer, the term of this patent is extended or adjusted under 35 U.S.C. 154(b) by 193 days.

(21) Appl. No.: 13/662,007

(22) Filed: Oct. 26, 2012

(65) Prior Publication Data

US 2013/0294227 A1 Nov. 7, 2013

(30) Foreign Application Priority Data

Dec. 2, 2011 (JP) .................................. 2011-264228

(51) Int. Cl.
*H04L 1/22* (2006.01)
*G06F 11/20* (2006.01)

(52) U.S. Cl.
CPC .............. *H04L 1/22* (2013.01); *G06F 11/2007* (2013.01); *G06F 2201/845* (2013.01)

(58) Field of Classification Search
CPC ......... H04L 41/00; H04L 41/04; H04L 45/28; H04L 69/40; H04L 45/22; H04L 1/22; H04Q 2011/0045; H04Q 2011/00; G06F 11/1497; G06F 11/14; G06F 11/2005; G06F 11/2071; G06F 11/2033; G06F 11/2007
USPC ......................................................... 370/218
See application file for complete search history.

(56) References Cited

U.S. PATENT DOCUMENTS

| 6,219,739 | B1 * | 4/2001 | Dutt et al. ..................... 710/311 |
| 7,487,531 | B1 * | 2/2009 | Vogel et al. ..................... 725/93 |
| 2004/0264364 | A1 * | 12/2004 | Sato .............................. 370/217 |
| 2005/0265346 | A1 * | 12/2005 | Ho et al. ........................ 370/392 |
| 2007/0168058 | A1 * | 7/2007 | Kephart et al. .................. 700/82 |
| 2007/0258359 | A1 * | 11/2007 | Ogasawara et al. ........... 370/218 |
| 2008/0025203 | A1 * | 1/2008 | Tallet ............................ 370/216 |
| 2009/0019130 | A1 * | 1/2009 | Kitani et al. .................. 709/209 |

(Continued)

FOREIGN PATENT DOCUMENTS

JP 2005-354362 12/2005

OTHER PUBLICATIONS

Brocade, FastIron Configuration Guide: Supporting Ironware Software Release 07.2.02, Feb. 18, 2011, pp. i-lvi, 1-1822.*

(Continued)

*Primary Examiner* — Gary Mui
*Assistant Examiner* — Michael Phillips
(74) *Attorney, Agent, or Firm* — Foley & Lardner LLP

(57) ABSTRACT

Network repeaters which each implement a redundant switching function previously grasp connection states of ports of a network system by using an inquiry frame and an exchange frame. At the time when a line is broken, when actively confirming a state of a port connected to a port in which a line is broken via a downstream device, the network repeaters each grasp that which portion of the line is broken and determine whether a switchover is required. Through the process, the network repeaters each prevent a useless switchover such as switching-back immediately after the switchover, and at the same time since a mechanism of waiting for a given length of times is not required, they each perform a fast switchover.

8 Claims, 10 Drawing Sheets

(56) References Cited

U.S. PATENT DOCUMENTS

| | | | |
|---|---|---|---|
| 2009/0109841 A1* | 4/2009 | Nozaki et al. | 370/218 |
| 2012/0063779 A1* | 3/2012 | Zhang et al. | 398/50 |
| 2013/0028135 A1* | 1/2013 | Berman | 370/254 |
| 2013/0033978 A1* | 2/2013 | Eckert et al. | 370/216 |

OTHER PUBLICATIONS

Brocade FastIron Configuration Guide; Supporting IronWare Software Release 07.2.02; Feb. 18, 2011; pp. i-lvi; 1-1822.

* cited by examiner

FIG.5

EXCHANGE FRAME DATA

| TRANSMISSION SOURCE INFORMATION OF INQUIRY FRAME | DEVICE IDENTIFIER |
| --- | --- |
| | PORT IDENTIFIER |
| RECEIVING-SIDE ADDITIONAL INFORMATION | DEVICE IDENTIFIER |
| | PORT IDENTIFIER |

FIG.6

601 PORT CONNECTION STATE TABLE

| 6011 | 6012 | | 6013 | |
| --- | --- | --- | --- | --- |
| LOCAL DEVICE INFORMATION | NEIGHBOR DEVICE INFORMATION | | CONFIRMATION CONDITIONS | |
| PORT IDENTIFIER | DEVICE IDENTIFIER | PORT IDENTIFIER | | |
| 101 | 20 | 201 | ○ | R1 |
| 102 | 20 | 202 | ○ | R2 |
| 103 | 20 | 203 | ○ | R3 |

REDUNDANT CONTROL DEVICE AND NETWORK SYSTEM

INCORPORATION BY REFERENCE

The present application claims priority from Japanese application JP2011-264228 filed on Dec. 2, 2011, the content of which is hereby incorporated by reference into this application.

BACKGROUND OF THE INVENTION

The present invention relates to a redundant control device and a network system, more particularly, to a master switching control technique of the redundant control device.

In general, in a network, a redundant configuration is adopted in such a manner that communication is not stopped due to the fact that a line or device is broken. In a plurality of redundant network repeaters, respective network repeaters are connected through a plurality of downstream devices and ports. Further, some network repeaters each having the large number of effective ports (the number of linked-up ports among the ports connected to the downstream devices) operate as an operation system. The above-described technique is disclosed, for example, in JP-A-2005-354362. The number of effective ports is compared to perform a priority determination among the plurality of redundant network repeaters, thereby switching an operation system and a waiting system.

Further, as a mechanism for preventing a useless switchover between the Operation system and the waiting system, switching prevention time is provided. Through the process, a technique for delaying a switchover is disclosed, for example, in Brocade/FastIron Configuration Guide Supporting IronWare Software Release 07.2.02, P477, "Changing the hold-down interval"

SUMMARY OF THE INVENTION

In the case of using a redundant switching technique for performing a priority determination through a comparison of the number of effective ports, it is recognized as a problem that when states of downstream devices or lines change, a time difference for detecting a port state is generated among a plurality of redundant network repeaters and a useless switchover is caused by the above-described fact. In particular, when a downstream device is broken or turned off etc., the number of effective ports ought to originally change in a plurality of redundant network repeaters at the same time. For example, in the plurality of redundant network repeaters, when a downstream device is turned off during a holiday or at night, since a port connecting the turned-off downstream device is linked down, the number of effective ports is reduced as much as the number of linked-down ports, respectively. However, since timing for detecting that a port is linked down is different in each network repeater, only the number of effective ports of particular network repeater is reduced depending on the timing. Comparison results about the number of effective ports are temporarily exchanged among network repeaters, and as a result, a switchover occurs which is unnecessary, not needed or useless.

The useless switchover herein means that although the number of effective ports about each network repeater changes due to the occurrence of events that a downstream device is turned off, a priority determination result based on the comparison of the final number of effective ports does not change and the switchover is not originally required. In a network system in which a loop occurs when a plurality of redundant network repeaters are capable of communication at the same time, the above-described problems are dominantly caused and the useless switchover brings about a communication interruption.

Conventionally, in this problem, as illustrated in Brocade/FastIron Configuration Guide Supporting IronWare Software Release 07.2.02, P477, "Changing the hold-down interval", the switchover is delayed, thereby preventing the useless switchover. However, even when the switchover ought to be originally performed, it is delayed and expansion of the communication interruption time is brought about.

In view of the foregoing, it is an object of the present invention to provide a technique in which in a redundant network repeater, a useless switchover is prevented and, when the switchover is required, delay of the switchover is prevented.

To accomplish the above-described objects, according to one aspect of the present invention, there is provided a network system. This network system includes, a first redundant control device; a second redundant control device, the second redundant control device as at least one other redundant control device being connected to the first redundant control device via downstream devices, wherein: the first redundant control device transmits from first ports connected to the downstream device an inquiry frame including a device identifier of the first redundant control device and port identifiers of the first ports, when the inquiry frame transmitted by the first redundant control device is received from second ports connected to the downstream devices in addition to a device identifier of the first redundant control device included in the inquiry frame and port identifiers of the first ports, the second redundant control device transmits to the first redundant control device an exchange frame including a device identifier of the second redundant control device and port identifiers of the second ports, and when receiving the exchange frame, based on information included in the exchange frame, the first redundant control device keeps connection states of the ports that the first ports of the first redundant control device and the second ports of the second redundant control device are connected via the downstream devices.

According to another aspect, there is a redundant control device connected to at least one other redundant control device via downstream devices. This redundant control device includes: a control unit configured to keep connection states of ports between the redundant control device and the other redundant control device connected via the downstream devices; and a transmission and reception unit configured to transmit and receive a control frame, wherein the transmission and reception unit transmits from first ports connected to the downstream devices an inquiry frame including a device identifier of the redundant control device and port identifiers of the first ports, in addition to a device identifier of the first redundant control device included in the inquiry frame and port identifiers of the first ports, the transmission and reception unit receives from the other redundant control device an exchange frame including a device identifier of the other redundant control device and port identifiers of second ports; and based on information included in the exchange frame received by the transmission and reception unit, the control unit keeps connection states of the ports that the first ports of the redundant control device and the second ports of the other redundant control device are connected via the downstream devices.

The invention permits the redundant network repeater to prevent a useless switchover.

Other objects, features and advantages of the invention will become apparent from the following description of the embodiments of the invention taken in conjunction with the accompanying drawings.

BRIEF DESCRIPTION OF THE DRAWINGS

FIG. 5 illustrates information stored in an exchange frame;

FIG. 6 illustrates an example of a port connection state table;

DETAILED DESCRIPTION OF THE EMBODIMENTS (First Embodiment)

In the present embodiment, there will be described an example in which when mutually grasping connection states via downstream devices, both redundant network repeaters determine that a failure occurs in which portion in a network and suppress switching delay, thereby preventing useless switching.

Figure 1:
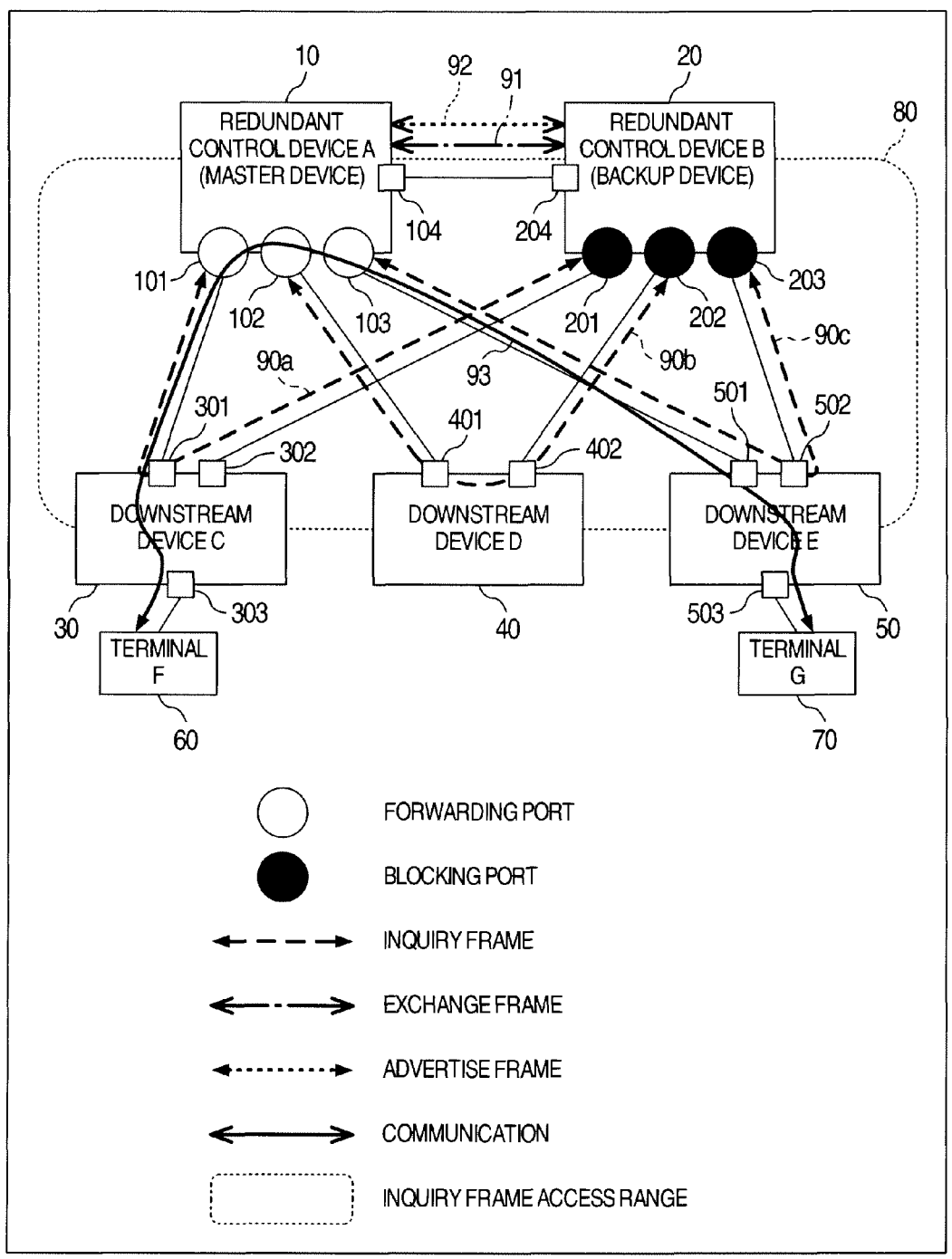
FIG. 1 illustrates configurations of a redundant network repeater and a system thereof.

FIG. 1 illustrates configurations of the redundant network repeater and system thereof according to the present embodiment. In the present embodiment, the redundant network repeater having a switching function is called a redundant control device. In the network configuration example of FIG. 1 the redundant control device A10 and redundant control device B20 as a network repeater each make up a redundant configuration. The redundant control device A10 has ports 101 to 103, and is connected to downstream devices C30 to E50 through each line such as the Ethernet (registered trademark) via each port. In the same manner, the redundant control device B20 has ports 201 to 203, and is connected to downstream devices C30 to E50 through each line such as the Ethernet (registered trademark) via each port. In short, ports of the redundant control devices A10 and B20 are connected via the downstream devices C30 to E50, respectively. Further, the redundant control devices A10 and B20 are directly connected via respective ports 104 and 204. Further, the downstream devices C30, D40, and E50 are connected to the redundant control devices A10 and B20 via ports 301 and 302, 401 and 402, and 501 and 502, respectively. Further, the downstream device C30 is connected to a terminal F60 via a port 303, and the downstream device E50 is connected to a terminal G70 via a port 503

The redundant control devices A10 and B20 compare the number of effective ports (the number of linked-up ports among the ports connected to the downstream device with each other and perform priority determination, thereby determining a state (operates by any of the master device and backup device) of each device. For providing communication to more downstream devices, a redundant control device having the large number of effective ports fundamentally operates as a master device capable of communicating with a downstream device and a redundant control device having the small number of effective ports fundamentally operates as a backup device incapable of communicating with a downstream device. In the case where the number of effective ports is the same as each other, the redundant control device to operate as a master device based on a device identifier is uniquely determined. Both of the redundant control devices A10 and B20 communicate with each other through an advertise frame about information necessary for the priority determination such as the number of effective ports and a device identifier, and grasp latest state.

In the present embodiment, there will be described an example which the redundant control device A10 operates as a master device, and the redundant control device B20 operates as a backup device. Note that in the case where logically multiplexed network is used, the above-described redundant control may be performed not for each device but for each logical work. For example, the redundant control can be performed, such as the redundant control device A10 is allowed to operate as a master device in a predetermined VLAN and the redundant control device B20 is allowed to operate as a master device in another ULAN.

The redundant control device A10 operating as a master device controls logical states of the ports 101 to 103 connected to the downstream devices C30 to E50 and sets them in forwarding ports. On the other hand, the redundant control device B20 operating as a backup device controls logical states of the ports 201 to 203 connected to the downstream devices C30 to E50 and sets them in blocking ports. The port setting is implemented not by performing link up and link down of ports but by logically setting each port in a state capable of communication or a state incapable of communication. In the forwarding port, both of control frames (inquiry frame, exchange frame, and advertise frame described below) and a normal communication frame such as a data frame are transmitted and received. On the other hand, in the blocking port, a normal communication frame is not transmitted and received, and only a control frame is transmitted and received. In the example of FIG. 1, the forwarding port is indicated by a white circle mark and the blocking port is indicated by a black circle mark.

The redundant control devices A10 and B20 transmit and receive the inquiry frames 90$a$ to 90$c$ as a control frame, exchange frame 91, and advertise frame 92, thereby exchanging information mutually. As will hereinafter be described in detail, the inquiry frames 90$a$ to 90$c$ and exchange frame 91 are used to confirm connection states of the ports. Further, the advertise frame 92 is used to confirm a port state and exchange information such as the number of effective ports and device identifier.

The inquiry frames 90$a$ to 90$c$ are frames for reaching from one redundant control device to another redundant control device via the downstream devices C30 to E50. Specifically, the inquiry frame 90$a$ is transmitted and received between the port 101 of the redundant control device A10 and the port 201 of the redundant control device B20 via the downstream device C30. The inquiry frame 90$b$ is transmitted and received between the port 102 of the redundant control device A10 and the port 202 of the redundant control device B20 via the downstream device D40. The inquiry frame 90c is transmitted and received between the port 103 of the redundant control device A10 and the port 203 of the redundant control device B20 via the downstream device E50.

On the other hand, when reaching from one redundant control device to another redundant control device, the exchange frame 91 and advertise frame 92 may be transmitted from any port. Specifically, the exchange frame 91 and advertise frame 92 may be transmitted and received via the port 104 of the redundant control device A10 and the port 204 of the redundant control device B20, or via the ports linked up from among the ports 101 to 103 of the redundant control device A10 and the ports 201 to 203 of the redundant control device B20.

Further, the inquiry frames 90a to 90c set logical networks (e.g., dedicated VLAN for transmitting and receiving the inquiry frame) used for the inquiry frame in an inquiry frame access range 80. At this time, the access range of the inquiry frames 90a to 90c may be limited to the redundant control devices A10 and B20 and the downstream devices C30 to E50.

The downstream devices C30 to E50 fail to control logical states of the ports. The downstream devices C30 to E50 are connected to both of the redundant control devices A10 and B20, and can communicate with other downstream devices via the master device in a communicable state.

The terminals F60 and G70 perform communication 93 via the downstream devices C30 and E50 and the forwarding ports 101 and 103 of the redundant control device A10 as the master device.

Next, an internal configuration of the redundant control devices A10 and B20 is illustrated.

Figure 2:
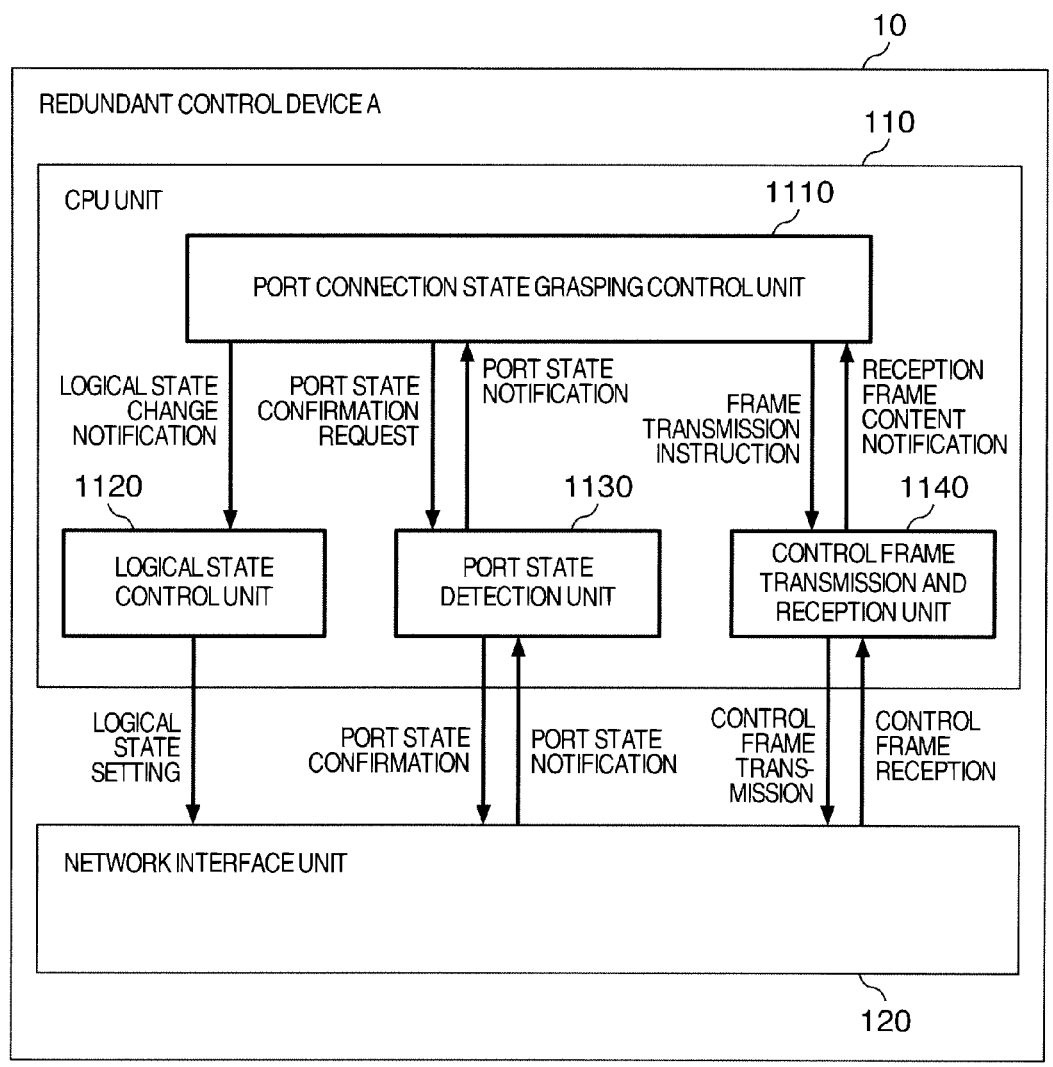
FIG. 2 is a block diagram illustrating an internal configuration of a redundant control device A10.

FIG. 2 is a block diagram illustrating an internal configuration of the redundant control device A10. Here, the redundant control device A10 will be described as an example, and the redundant control device B20 also has the same configuration as that of the redundant control device A10. The redundant control device A10 includes a CPU unit 110 and a network interface unit 120. The CPU unit 110 has a port connection state grasping control unit 1110, a logical state control unit 1120, a port state detection unit 1130, and a control frame transmission and reception unit 1140. Although the illustration is omitted, the network interface unit 120 has a plurality of ports.

The port connection state grasping control unit 1110 controls the logical state control unit 1120, port state detection unit 1130, and control frame transmission and reception unit 1140. The port connection state grasping control unit 1110 further changes a logical state of a port (forwarding port or blocking port) and confirms a port state (link up or link down), thereby grasping a connection state of the port. When notified of states (link up or link down) of each port by the port state detection unit 1130, the port connection state grasping control unit 1110 always grasps the number of effective ports about a local device. Further, when regularly transmitting and receiving the other redundant control device and an advertise frame via the control frame transmission and reception unit 1140, the port connection state grasping control unit 1110 notifies the other redundant control device of the number of effective ports and device identifier about the local device, and grasps also the number of effective ports and device identifier of the other redundant control device. When grasping the number of effective ports and device identifiers of the local device and the other device, the port connection state grasping control unit 1110 determines whether the local device ought to operate as a master device or a backup device.

The logical state control unit 1120 receives a notification from the port connection state grasping control unit 1110 and sets logical states to ports included in the network interface unit 120. Through the process, the logical state control unit 1120 sets each port to the forwarding port or blocking port.

The port state detection unit 1130 receives a request from the port connection state grasping control unit 1110, confirms port states, and notifies the port connection state grasping control unit 1110 that each port is located in any state of the link up and link down.

The control frame transmission and reception unit 1140 receives an instruction from the port connection state grasping control unit 1110 and transmits control frames such as the inquiry frame 90, exchange frame 91, and advertise frame 92 from a predetermined port of the network interface unit 120. When receiving the control frames from each port, the control frame transmission and reception unit 1140 further notifies the port connection state grasping control unit 1110 of contents about the received control frames.

The network interface unit 120 has a plurality of ports root illustrated), sets logical states of each port, confirms port states, and transmits and receives various frames based on the instruction from the CPU part 110. Based on the logical states of ports, the network interface unit 120 controls both of the normal communication frame and control frame to be transmitted and received to and from the forwarding port, and controls only the control frame to be transmitted and received without transmitting and receiving the normal communication frame to and from the blocking frame. Further, the network interface unit 120 autonomously detects a port state (link up or link down) of each port and, in the case where port states of each port are changed, appropriately notifies the port state detection unit 1130 of the above change. The port state detection unit 1130 appropriately notifies the port connection state grasping control unit 1110 of the change in the port states of each port notified by the network interface unit 120.

Next, there will be described a process for grasping a connection state of the port in the redundant control devices A10 and B20 with reference to FIGS. 3A and 3B. This process is previously performed before a factor (e.g., failure) for switching the redundant control device occurs. Further, this process is a process for grasping that each port of one redundant control device is connected to which port of the other redundant control device via the downstream device.

Figure 3A:
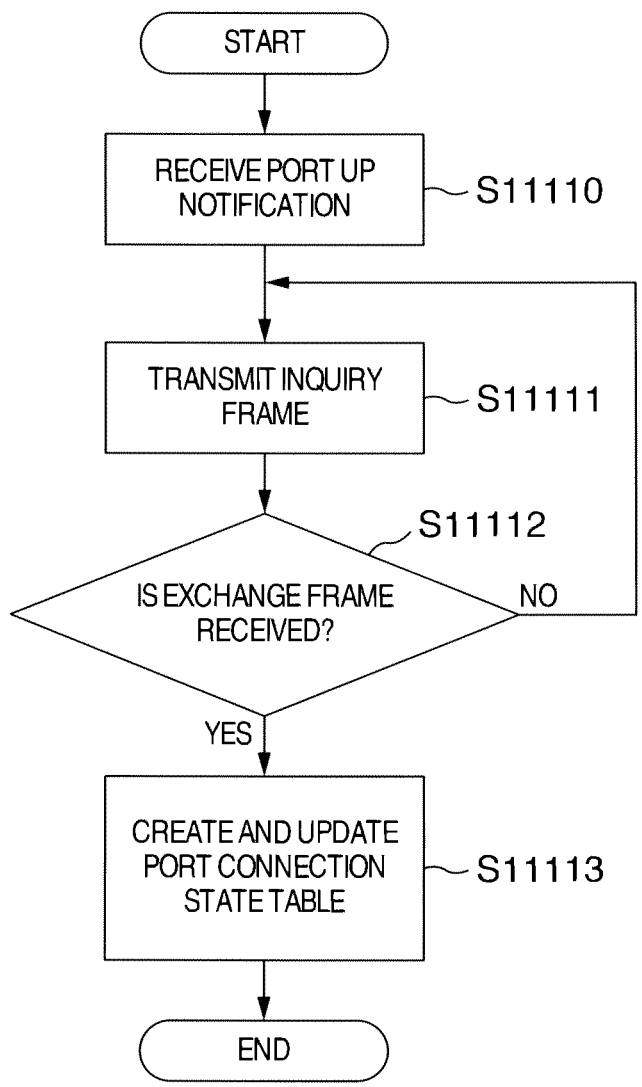
FIG. 3A is an example of a flowchart illustrating a process at the time of transmitting an inquiry frame.

FIG. 3A is an example of a flowchart illustrating a process at the time of transmitting the inquiry frame. The port connection state grasping control unit 1110 starts this process as a chance of receiving a port up notification for notifying by the port state detection unit 1130 that a predetermined port is linked up (Step S11110). Here, as an example, there will be described a case where the port 101 of the redundant control device A10 is linked up. The port connection state grasping control unit 1110 instructs the control frame transmission and reception unit 1140 to transmit the inquiry frame 90a from the linked-up port 101 (Step S11111). The control frame transmission and reception unit 1140 transmits the inquiry frame 90a from the port 101.

Figure 4:
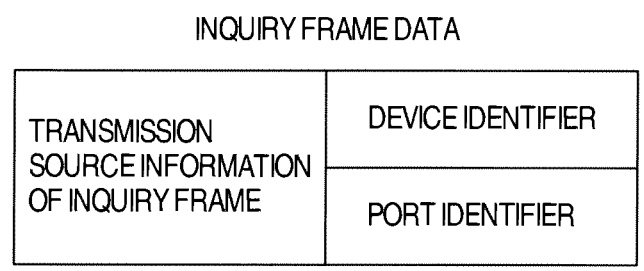
FIG. 4 illustrates information stored in an inquiry frame.

FIG. 4 illustrates information stored in the inquiry frame 90. As illustrated in FIG. 4, in the inquiry frame 90, a device identifier and port identifier of transmission source device in its own frame are stored. Here, for transmitting the inquiry frame 90a from the port 101 of the redundant control device A10, the device identifier "10" and port identifier "101" are stored in the inquiry frame 90a. When including the foregoing information, the inquiry frame 90 is not required to be a frame in which only an inquiry frame is intended.

Details will be described after with reference to FIG. 3B. At step S11111, the redundant control device B20 receives the inquiry frame 90a transmitted from the redundant control device A10 by the port 201 via the downstream device C30. At this time, the redundant control device B20 transmits the exchange frame 91 to the redundant control device A10 as a response. As illustrated in FIG. 5, in the exchange frame 91, a device identifier and port identifier of the device by which the inquiry frame 90 is transmitted are stored as transmission source information of the inquiry frame. Further, a port identifier of reception port and device identifier of the device by which the inquiry frame 90 is received are stored as receiving-side additional information.

There will be described a case where the redundant control device A10 receives the exchange frame 91 from the redundant control device B20 as a response of the inquiry frame 90a transmitted at step S11111 (Yes at step S11112). In this exchange frame 91, the device identifier "10" and port identifier "101" are stored as the transmission source information of the inquiry frame, and the device identifier "20" and port identifier "201" are stored as the receiving-side additional information. When the network interface unit 120 receives the exchange frame 91, the control frame transmission and reception unit 1140 of the redundant control device A10 notifies the port connection state grasping control unit 1110 of the transmission source information of the inquiry frame and receiving-side additional information stored in the exchange frame 91

Here, in the case where the exchange frame 91 is received at step S11112 (Yes at step S11112), the redundant control device A10 grasps a connection state of the port (namely, the port 101 of the redundant control device A10 and the port 201 of the redundant control device B20 are connected via the downstream device C30) between the redundant control devices A10 and B20. When receiving the exchange frame 91, the redundant control device A10 further confirms that the inquiry frame 90 transmitted by the redundant control device A10 safely reaches the redundant control device B20 and a connection state of the port is grasped also by the redundant control device B20. On the other hand, when the exchange frame 91 is not received (No at step S11112), the process returns to step S11111 and the redundant control device A10 continues to transmit the inquiry frame 90.

When notified by the control frame transmission and reception unit 1140 of contents (the receiving-side additional information and the transmission source information of the inquiry frame) about the exchange frame 91, the port connection state grasping control unit 1110 of the redundant control device A10 creates and updates a port connection state table 601 (Step S11113).

FIG. 6 is an example of the port connection state table 601. The port connection state table 601 includes local device information 6011, neighbor device information 6012, and confirmation condition 6013, and is a table for keeping a connection state of the port between the redundant control device A10 and the other redundant control device. Here, at step S11112, the redundant control device A10 confirms as the port connection state that the port 101 of the redundant control device A10 and the port 201 of the redundant control device B20 are connected via the downstream device C30, and therefore, updates the port connection state table 601 as in a record R1 of FIG. 6. The record R1 of FIG. 6 represents that the port 101 of the redundant control device A10 as a local device and the port 201 of the redundant control device B20 as a neighbor device are connected via the downstream device, and that this port connection state is confirmed also by the redundant control device B20 as the neighbor device. Suppose further that records R2 and R3 are also updated in the same manner.

When the exchange frame is received at step S11112 and the port connection state table is created and updated at step S11113, the redundant control device A10 stops transmitting the inquiry frame 90, however, it is not limited thereto and the redundant control device A10 may regularly transmit the inquiry frame 90

Next, a process at the time of receiving the inquiry frame 90 will be described.

Figure 3B:
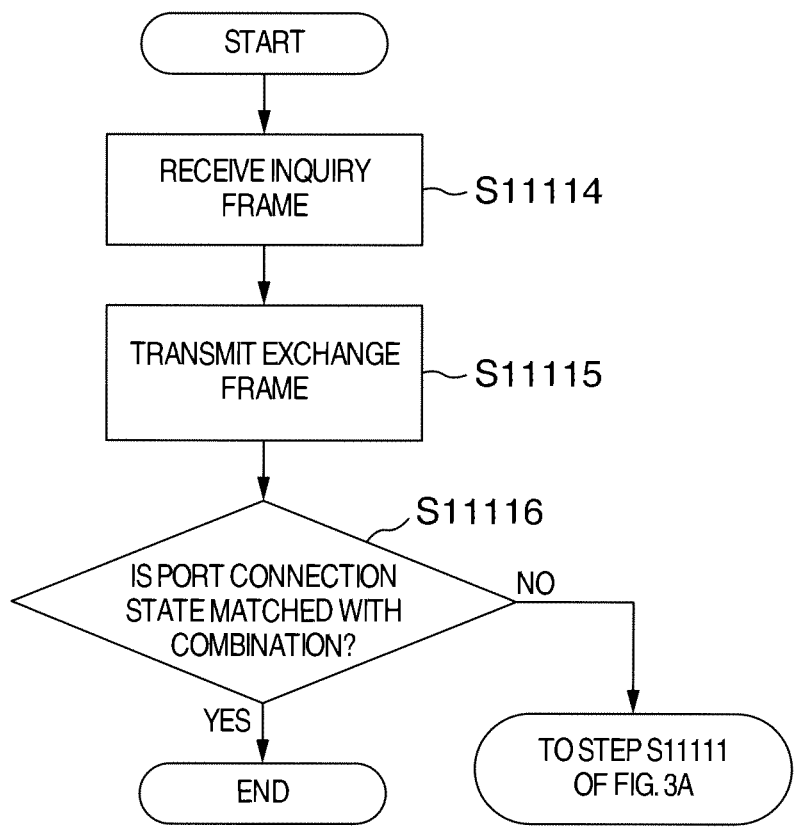
FIG. 3B is an example of a flowchart illustrating process at the time of receiving an inquiry frame.

FIG. 3B is an example of a flowchart illustrating a process at the time of receiving the inquiry frame. Here, as an example, there will be described a case where the redundant control device B20 receives the inquiry frame 90a transmitted by the redundant control device A10 at step S11111 of FIG. 3A. The inquiry frame 90a transmitted by the redundant control device A10 is received through the port 201 of the redundant control device B20 via the downstream device C30. At this time, the control frame transmission and reception unit 1140 of the redundant control device B20 notifies the port connection state grasping control unit 1110 of contents about the received inquiry frame 90a (Step S11114). Specifically, the control frame transmission and reception unit 1140 notifies the port connection state grasping control unit 1110 of the device identifier "10" and port identifier "101" stored in the inquiry frame 90a as the transmission source information of the inquiry frame.

When notified by the control frame transmission and reception unit 1140 of contents about the inquiry frame 90a, the port connection state grasping control unit 1110 of the redundant control device B20 adds the receiving-side additional information to contents about the inquiry frame 90a and creates an exchange frame, thereby transmitting it to the redundant control device A10 (Step S11115). In addition, the receiving-side additional information means that information about an identifier of the device by which the inquiry frame 90a is received and information about the received port identifier. Specifically, at step S11115, in the exchange frame 91 transmitted by the redundant control device B20, the device identifier "10" and port identifier "101" are stored as the transmission source information of the inquiry frame. On the other hand, the device identifier "20" and port identifier "201" are stored as the receiving side additional information (refer to FIG. 5).

Next, the port connection state grasping control unit 1110 of the redundant control device B20 confirms whether information of the inquiry frame 90 received at step S11114 is matched with contents of the port connection state table 601 kept by its own unit (Step S11116). Specifically, the port connection state grasping control unit 1110 confirms whether a combination of information about the device identifier and port identifier stored in the inquiry frame 90 as the transmission source information of the inquiry frame and information about the port identifier of the port of the local device by which the inquiry frame is received is matched with a connection state of the port stored in the port connection state table 601.

If so at step S11116 (Yes at step S11116), the process ends. If not (No at step S11116), the process proceeds to step S11111 of FIG. 3a. When performing steps S11111 to S11113, the port connection state grasping control unit 1110 creates and updates the port connection state table. As an example of the case where the port connection state is not matched with the above combination at step S11116, the following cases are considered. For example, the port connection state table 601 is not yet created in the redundant control device B20. As a result in which a port in which the redundant control device A10 is connected to the downstream device C30 is changed, a port identifier stored in the inquiry frame 90a is considered to be changed. In the above-described cases, since a correct connection state of the port is reflected on the port connection state table 601, the port connection state grasping control unit 1110 performs step S11111 or later of FIG. 3a.

In the case where the port connection state is not matched with the above combination at step S11116, the port connection state grasping control unit 1110 does not necessarily perform steps S11111 to S11113 of FIG. 3A (creates and updates the port connection state table after transmitting the inquiry frame). Based on information about the port identifiers of ports of the local device by which the inquiry frame is received at step S11114 and information about the device identifiers and port identifiers included in the inquiry frame, the port connection state grasping control unit 1110 may create and update the port connection state table.

Through the flowcharts of FIGS. 3A and 3B described above, the redundant control device A10 grasps a connection state of the port between its own device and the redundant control device B20 as the neighbor device. Also, when performing the same process as that of the redundant control device A10, the redundant control device B20 grasps a connection state of the port between its own device and the redundant control device A10 as the neighbor device.

Next, a process for determining whether a switchover from a master device to a backup device is required along with change in the number of effective ports will be described with reference to FIGS. 7 and 8.

Figure 7:
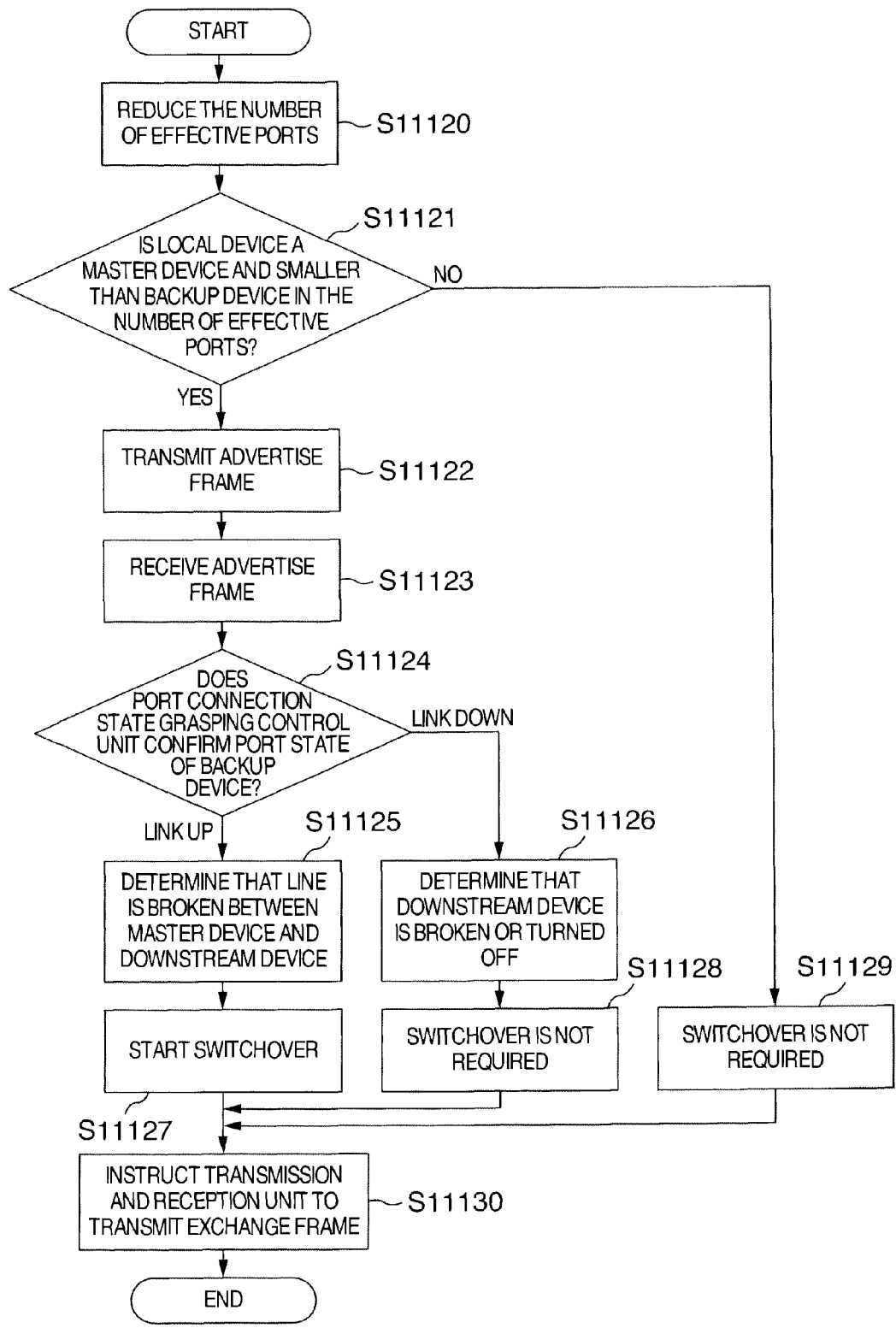
FIG. 7 is an example of a flowchart illustrating a process of a port connection state grasping control unit.

FIG. 7 is an example of a flowchart illustrating a process of the port connection state grasping control unit 1110.

The port connection state grasping control unit 1110 is notified by the port state detection unit 1130 that a port connected to the downstream device is linked down, and determines that the number of effective ports is reduced (Step S11120). The port connection state grasping control unit 1110 further determines whether to satisfy a condition that the local device is a master device and smaller than a backup device in the number of effective ports (Step S11121). If not (No at step S11121), the port connection state grasping control unit 1110 determines that the switchover is not required (Step S11129).

On the other hand, if so (Yes at step S11121), the port connection state grasping control unit 1110 transmits an advertise frame for confirming a state of the port of the neighbor device connected to the port notified that it is linked down at step S11120 via the downstream device (Step S11122). Specifically, suppose, for example, that the port connection state grasping control unit 1110 of the redundant control device A10 is notified by the port state detection unit 1130 that the port 101 is linked down at step S11120. In this case, at step S11122, the port connection state grasping control unit 1110 of the redundant control device A10 refers to the port connection state table 601, and confirms that the linked-down port 101 is connected to the port 201 of the redundant control device B20 via the downstream device C30. For this purpose, the port connection state grasping control unit 1110 of the redundant control device A10 requests the control frame transmission and reception unit 1140 to transmit to the redundant control device B20 an advertise frame for confirming whether the port 201 of the redundant control device B20 is also linked down in the same manner.

Here, a process of the port connection state grasping control unit 1110 of the neighbor device (backup device) by which the advertise frame transmitted at step S11122 of FIG. 7 is received will be described with reference to FIG. 8.

Figure 8:
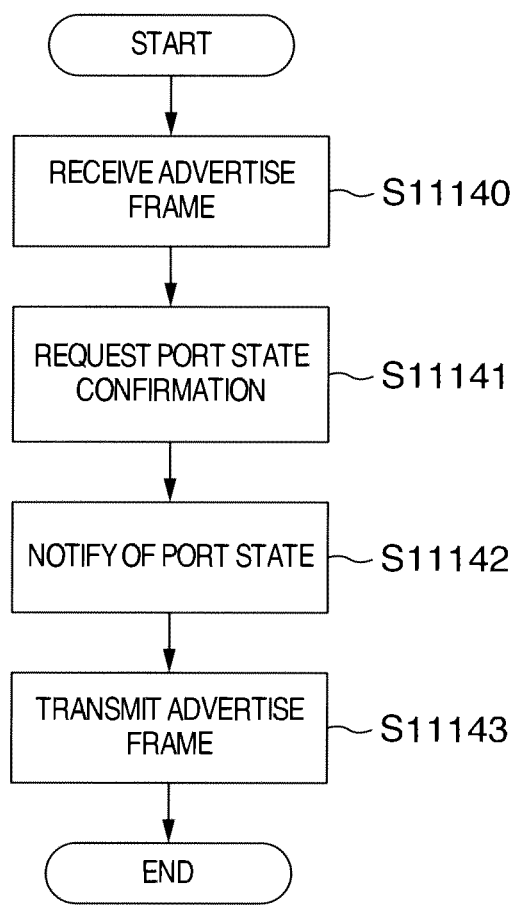
FIG. 8 is an example of a flowchart illustrating a process of a port connection state grasping control unit of a backup device at the time of receiving an advertise frame.

FIG. 8 is an example of a flowchart illustrating a process of the port connection state grasping control unit 1110 of the backup device at the time of receiving the advertise frame.

When the advertise frame is received through the backup device, the port connection state grasping control unit 1110 is notified of reception contents about the advertise frame by the control frame transmission and reception unit 1140 (Step S11140). Here, examples of the notified contents include those representing a confirmation request of port state (link up or link down) of the port 201.

For freshly confirming the requested port state, the port connection state gasping control unit 1110 of the backup device requests the port state detection unit 1130 to confirm the port state (Step S11141). In the present embodiment, a port to be confirmed is supposed to be notified through the advertise frame. Further, the master device may notify the backup device of a port identifier about the linked-down port and the backup device may refer to the port connection state table on the backup device side, thereby identifying the port to be confirmed (port connected to the linked-down port via the downstream device).

The port state detection unit 1130 confirms a state of the port. Further, when a method such as an auto-negotiation is capable of determining whether a port continues to be linked up, any method may be used as a confirmation method of the port state. The port connection state grasping control unit 1110 is notified of confirmation results (link up or link down) about the port state by the port state detection unit 1130 (Step S11142). At this time, the port connection state grasping control unit 1110 transmits to the master device through the control frame transmission and reception unit 1140 the advertise frame in which the confirmation results about the port state are stored (Step S11143).

Returning again to FIG. 7, a description will be made. When the master device receives the advertise frame transmitted from the backup device, the port connection state grasping control unit 1110 of the master device is notified of reception contents about the advertise frame by the control frame transmission and reception unit 1140 (Step S11123). The port connection state grasping control unit 1110 confirms a state of the port of the notified backup device (Step S11124). In the case where the port is "linked up", since only a port in which the master device is connected to the downstream device is linked down (for example, the port 101 of the redundant control device A10 is linked down and the port 201 of the redundant control device 820 is linked up), the port connection state grasping control unit 1110 determines that a link is broken between the master device and downstream devices thereof (Step S11125). In this case, for securing communication of the downstream devices, the port connection state grasping control unit 1110 starts the switches er from the master device to the backup device (Step S11127).

On the other hand, in the case where the port is "linked down" is determined at step S11124, since both of a port in which the master device is connected to the downstream device and a port in which the backup device is connected to the downstream device are linked down (for example, both of the port 101 of the redundant control device A10 and the port 201 of the redundant control device B20 are linked down the port connection state grasping control unit 1110 determines that the downstream device is broken or turned off (Step S11126). In this case, since a magnitude correlation about the number of effective ports does not change between the master device and the backup device, the port connection state grasping control unit 1110 determines that the switchover is not required (Step S11128).

Via the control frame transmission and reception unit 1140, the port connection state grasping control unit 1110 finally transmits the exchange frame for deleting connection information on the linked-down port from the port connection state table 601 of the neighbor device. At the same time the port connection state grasping control unit 1110 deletes the connection information on the linked-down port also from the port connection state table 601 of the local device (Step S11130).

According to the present embodiment described above, in the case where the master device and the backup device are connected via the downstream device, when the master device detects that a port in which its on device is connected to the downstream device is linked down, the port connection state grasping control unit 1110 confirms whether a port of the backup device connected to the same downstream device is also linked down in the same manner and further determines whether the switchover of the master device is required. Therefore, it is assumed here that through the fact that the downstream device is turned off the master device previously detects that a port is linked down, and the number of effective ports is temporarily smaller than that of the backup device. Even in the above case, the port connection state grasping control unit 1110 prevents a useless switchover from occurring.

Next, an operation example in the case where the downstream device is broken or turned off will be described.

Figure 9:
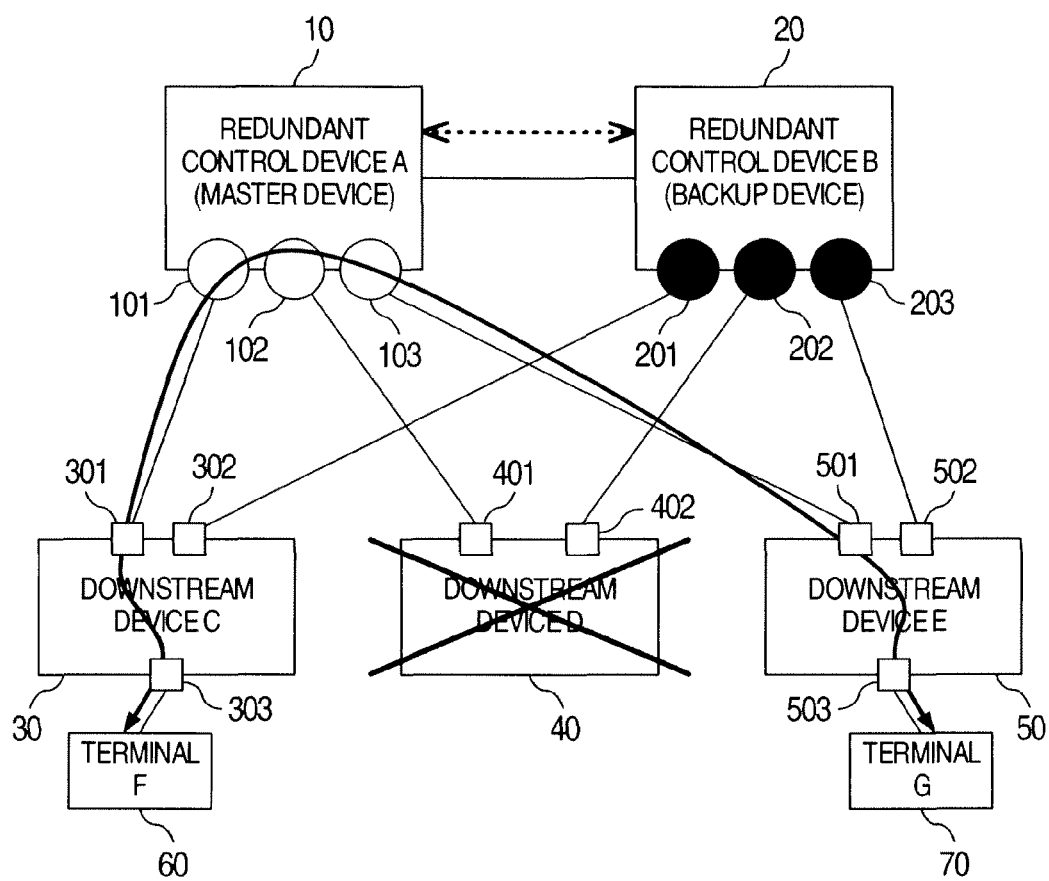
FIG. 9 is an operation example in the case where a downstream device is broken or turned off.

FIG. 9 illustrates an operation example in the case where the downstream device D40 is broken or turned off.

In the case where the downstream device C40 is broken or turned off and the redundant control device A10 (master device) previously grasps that the number of effective ports is reduced, a conventional operation example will be first described. When the downstream device D40 is broken or turned off, the redundant control device A10 as the master device detects that the port 102 is linked down. At this time, since the redundant control device B20 as the backup device does not yet detect that the port 202 is linked down, the redundant control device A10 determines that the number of effective ports is reduced as compared with the redundant control device B20, and further starts the switchover from the master device to the backup device.

Next the redundant control device B20 as a new master device detects that the port 202 is linked down. As a result since the redundant control devices A10 and B20 have the same number of effective ports, the redundant control device B20 starts the switchover so that the redundant control device A10 may become a master device again.

Here, in a network in which a loop occurs when communicable states are generated at the same time as in a layer 2, both of the devices are incapable of communication. Therefore, in the case of the conventional operation example, when the master device is switched, communication interruptions of two times are caused between the terminals 60 and 70.

In the same manner, operations of the present embodiment will be described below with reference to FIG. 9. Description will be made based on the flowchart illustrated in FIGS. 7 and 8. Suppose that the port connection state table 601 of FIG. 6 is kept based on the flowcharts illustrated in FIGS. 3A and 3B.

When the downstream device D40 is broken or turned off, the redundant control device A10 as a maser device detects that the port 102 is linked down and the number of effective ports is reduced (Step S11120). The redundant control device A10 determines that the local device is a master device and has the number of effective ports smaller than that of the backup device (Yes at step S11121). Accordingly, the redundant control device A10 refers to the port connection state table 601 of FIG. 6 and confirms a port state of the port 202 of the redundant control device B20, and therefore transmits the advertise frame (Step S11122).

The redundant control device B20 as a neighbor device receives the advertise frame Step S11140) and freshly confirms that the port 202 is linked up (Step S11141). Here, the downstream device D40 is broken or turned off, and therefore, when the port 202 is freshly confirmed, the redundant control device B20 detects that the port 202 is linked down (Step S11142). The redundant control device B20 transmits the advertise frame in which this confirmation result is stored via the control frame transmission and reception unit 1140 (Step S11143).

The redundant control device A10 as a master device receives the advertise frame (Step S11123), and confirms a state of the port 202 of the redundant control device B20 as a backup device (Step S11124). When determining that the port is linked down, the port connected to the downstream device D40 is linked down in both of the master device and the backup device, and therefore the redundant control device A10 determines that the downstream device D40 is broken or turned off (Step S11126). In this case, the number of effective ports is reduced in both of the master device and the backup device and the magnitude correlation about the number of effective ports does not change, and therefore the redundant control device A10 determines that the switchover of the master device is not required (Step S11128). As a result, the switchover is not performed, and the communication between the terminals 60 and 70 continues without interruption.

As can be seen from the above discussion, according to the present embodiment, a conventional useless switchover of the master device can be prevented.

Next, an operation example in the case where a line is broken between the downstream device C30 and the redundant control device A10 as a master device will be described.

Figure 10:
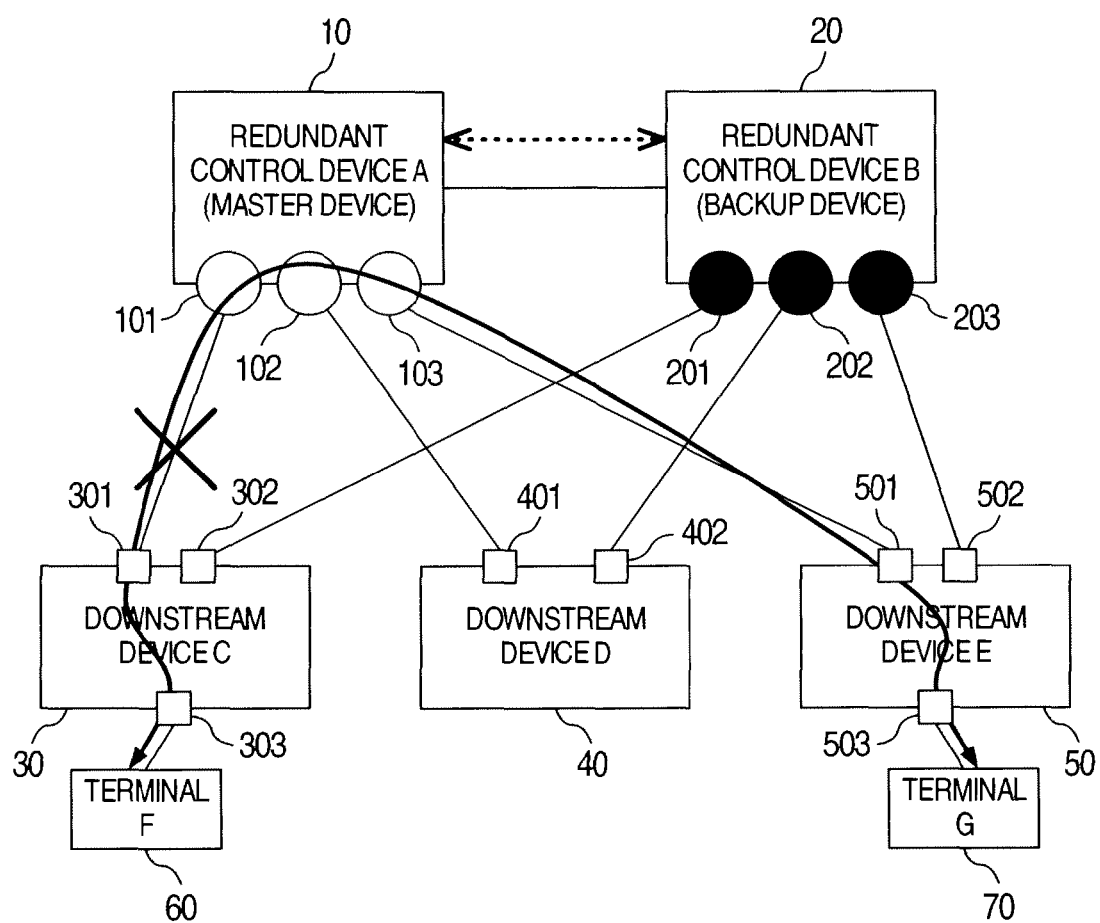
FIG. 10 is an operation example in the case where a line is broken between a redundant control device and a downstream device.

FIG. 10 illustrates an operation example in the case where a line is broken between the downstream device C30 and the redundant control device A10.

A line is broken between the redundant control device A10 and the downstream device C30, and the redundant control device A10 as a master device previously grasps that the number of effective ports is reduced. Operations in the above case according to the present embodiment will be described based on the flowchart of FIGS. 7 and 8. Suppose that the port connection state table 601 illustrated in FIG. 6 is previously kept in the redundant control device A10 based on the flowchart illustrated in FIG. 3.

The redundant control device A10 as a master device detects that the port 101 is linked down and the number of effective ports is reduced (Step S11120). The local device is a master device, and has the number of effective ports smaller than that of the backup device (Yes at step S11121). Accordingly, the redundant control device A10 refers to the port connection state table 601 of FIG. 6 and confirms a port state of the port 201 of the redundant control device B20, and therefore transmits the advertise frame (Step S11122).

The redundant control device B20 as a neighbor device receives the advertise frame (Step S11140), and freshly confirms that the port 201 is linked up (Step S11141). Here, only a link is broken between the redundant control device A10 and the downstream device C30. Therefore, as a result of fresh confirmation of the port 201, the redundant control device B20 detects that the port 201 is linked up (Step S11142). The redundant control device B20 transmits an advertise frame in which this confirmation result is stored to the redundant control device A10 (Step S11143).

The redundant control device A10 as a master device receives a reception content notification of the advertise frame (Step S11123), and confirms and determines a state of the port 201 of the backup device (Step S11124). Here, since the port 201 is linked up, the redundant control device A10 determines that a link is disturbed between the master device and the downstream device (Step S11125). In this case, for securing communication of the downstream device, the redundant control device A10 starts to switch the master device (Step S11127). Due to this switchover, a communication interruption of one time occurs between the terminals 60 and 70. However, these features of the first embodiment permit the redundant control device A10 to fast switch a master device without waiting for a given length of time as if a technique disclosed in Non-Patent Literature 1.

(Second Embodiment)

In the present embodiment, there will be described an example where three redundant control devices being a network repeater which implements a redundant switching function are connected to each other. Even if three redundant control devices or more are connected to each other, the same operations as those of the first embodiment are performed. Previously, the redundant control device needs to carefully grasp a connection state and determine whether a switchover is required.

Figure 11:
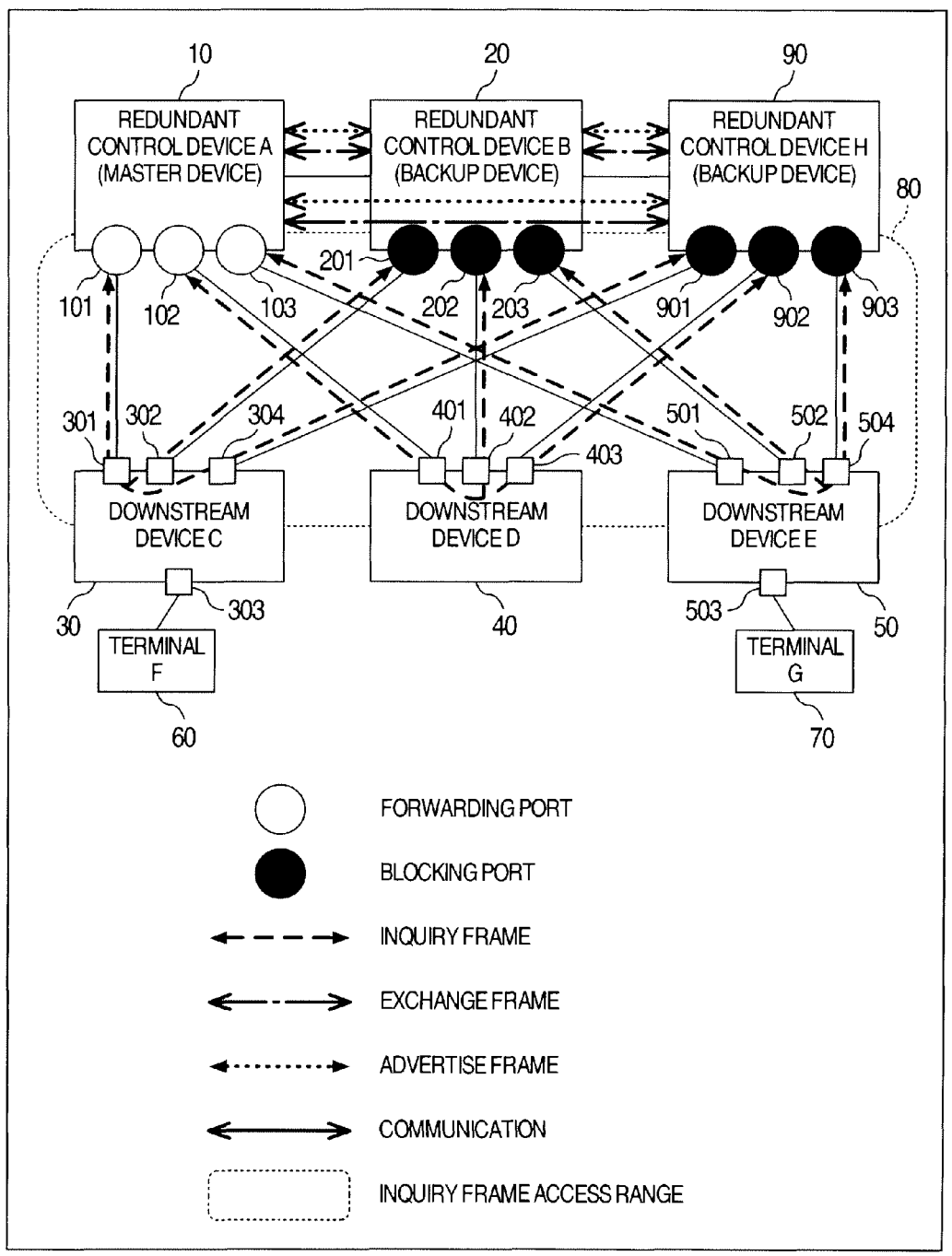
FIG. 11 is an example of a system configuration in which three redundant control devices are connected to each other.

FIG. 11 is an example of a system configuration in which three redundant control devices are connected to each other. FIG. 11 mainly differs from FIG. 1 in that a redundant control device H90 is freshly added to FIG. 1. The redundant control device H90 has a plurality of ports, and is connected to the downstream devices C to E, respectively. In addition, the redundant control devices A10, B20, and H90 are directly connected to each other, respectively, and transmit and receive an exchange frame and an advertise frame.

In the present embodiment, each redundant control device previously grasps connection states of the ports of FIGS. 3A and 3B. An inquiry frame from each redundant control device is transmitted so as to reach the other redundant control devices. For example, the inquiry frame transmitted from the port 101 of the redundant control devices A10 reaches the port 201 of the redundant control device B20 and the port 901 of the redundant control device H90 via the downstream device C. The inquiry frame may be transmitted by a multicast or by a unicast to the other redundant control devices. In the same manner, an exchange frame from each redundant control device is also transmitted so as to reach the other redundant control devices. As a result, connection states of the ports are grasped among all the redundant control devices.

About determination whether to require the switchover of the master device of FIGS. 7 and 8, all ports connected to the linked-down port of the master device via the downstream devices are linked down is determined at step S11124. In this case, since all devices of the master device and the backup devices similarly detect that the ports are linked down, the redundant control device A10 determines that the downstream device is broken or turned off (Step S11126). Specifically, when the port 101 of the redundant control device A10 as a master device is linked down, the redundant control device A10 detects that the number of effective ports is reduced. In the same manner, any of the port 201 of the redundant control device B20 as a backup device and the port 901 of the redundant control device H90 as a backup device are linked down. In the above case, the redundant control device A10 determines that the downstream device C is broken or turned off. In this case, since the magnitude correlation about the number of effective ports does not change before and after the occurrence of the link down, the redundant control device A10 determines that the switchover of the master device is not required (Step S11128).

On the other hand, among the ports connected via the downstream devices, all the ports are not necessarily linked down. When including a port linked up as it is, the redundant control device A10 determines that a link is broken between the master device and the downstream devices thereof (Step S11125). In this case, for securing communication of the downstream devices, the redundant control device A10 starts to switch the master device (Step S11127).

It should be further understood by those skilled in the art that although the foregoing description has been made on embodiments of the invention, the invention is not anted thereto and various changes and modifications may be made without departing from the spirit of the invention and the scope of the appended claims.

The invention claimed is:

1. A network system comprising:
a first redundant control device; and
a second redundant control device, the second redundant control device as at least one other redundant control device being connected to the first redundant control device via downstream devices,
wherein:
the first redundant control device is configured to transmit from first ports connected to the downstream device an inquiry frame including a device identifier of the first redundant control device and port identifiers of the first ports;
when the inquiry frame transmitted by the first redundant control device is received from second ports connected to the downstream devices, in addition to a device identifier of the first redundant control device included in the inquiry frame and port identifiers of the first ports, the second redundant control device is configured to transmit to the first redundant control device an exchange frame including a device identifier of the second redundant control device and port identifiers of the second ports; and
when receiving the exchange frame, based on information included in the exchange frame, the first redundant control device is configured to keep connection states of the ports that the first ports of the first redundant control device and the second ports of the second redundant control device are connected via the downstream devices,
wherein:
in the case where the first redundant control device operates as a master device and the second redundant control device operates as a backup device,
when detecting that the first ports are linked down, the first redundant control device is configured to refer to connection states of the ports, confirm that the first ports are connected to the second ports of the second redundant control device via the downstream device, and transmit a first advertise frame for confirming states of the second ports to the second redundant control device;
when receiving the first advertise frame, the second redundant control device is configured to confirm whether the second ports are linked up, and transmit a second advertise frame in which a confirmation result of whether the second ports are linked up is stored to the first redundant control device; and
the first redundant control device is configured to confirm the second advertise frame and, when the second ports are linked up, switch from a master device to a backup device and, when the second ports are linked down, not switch from a master device to a backup device.

2. The network system according to claim 1, wherein:
in the case where the first redundant control device determines whether a switchover of the master device is required, based on the number of effective ports indicating the number of the link-up ports among ports connected to the downstream devices,
as a result of detecting that the first ports are linked down, when determining that the number of effective ports of a local device is smaller than that of the second redundant control device, the first redundant control device is configured to transmit the first advertise frame.

3. The network system according to claim 1, wherein when receiving the inquiry frame, the second redundant control device is configured to determine whether connection states of the ports that the first ports of the first redundant control device and the second ports of the second redundant control device are connected via the downstream devices are kept in a local device and, when the connection states of the ports are not kept in the local device, transmit from the second ports a second inquiry frame including a device identifier of the local device and port identifiers of the second ports.

4. The network system according to claim 1, wherein the first redundant control device is configured to regularly transmit the inquiry frame and, when the exchange frame is received from the second redundant control device, stop transmitting the inquiry frame.

5. A redundant control device connected to at least one other redundant control device via downstream devices, the redundant control device comprising:
a control unit configured to keep connection states of ports between the redundant control device and the other redundant control device connected via the downstream devices; and
a transmission and reception unit configured to transmit and receive a control frame,
wherein:
the transmission and reception unit is configured to transmit from first ports connected to the downstream devices an inquiry frame including a device identifier of the redundant control device and port identifiers of the first ports;
in addition to a device identifier of the first redundant control device included in the inquiry frame and port identifiers of the first ports, the transmission and reception unit is configured to receive from the other redundant control device an exchange frame including a device identifier of the other redundant control device and port identifiers of second ports; and
based on information included in the exchange frame received by the transmission and reception unit, the control unit is configured to keep connection states of the ports that the first ports of the redundant control device and the second ports of the other redundant control device are connected via the downstream devices,
wherein:
in the case where the first redundant control device operates as a master device and the other redundant control device operates as a backup device,
when detecting that the first ports are linked down, the control unit is configured to refer to connection states of the ports, confirm that the first ports are connected to the second ports of the other redundant control device via the downstream devices, and instruct the transmission and reception unit to transmit a first advertise frame for confirming states of the second ports to the other redundant control device;
the transmission and reception unit is configured to transmit the first advertise frame to the other redundant control device;
the transmission and reception unit is configured to receive a second advertise frame from the other redundant control device indicating port states of the second ports; and
the control unit is configured to confirm the second advertise frame received by the transmission and reception unit and, when the second ports are linked up, switch from the master device to the backup device and, when the second ports are linked down, not switch from the master device to the backup device.

6. The redundant control device according to claim 5, wherein:
in the case where the control unit determines whether a switchover of the master device is required, based on the number of effective ports indicating the number of the linked-up ports among the ports connected to the downstream devices,
as a result of detecting that the first ports are linked down, when determining that the number of effective ports of the master device is smaller than that of the other redundant control device, the control unit is configured to instruct the transmission and reception unit to transmit the first advertise frame.

7. The redundant control device according to claim 5, wherein:
in the case where the transmission and reception unit receives a second inquiry frame including device identifiers of the other redundant control devices and port identifiers of third ports by the first ports,
the control unit is configured to determine whether the kept connection states of the ports are matched with contents of the second inquiry frame and, when the connection states of the ports are not matched with contents of the second inquiry frame, instruct the transmission and reception unit to transmit a third inquiry frame including a device identifier of the master device and port identifiers of the first ports from the first ports; and
the transmission and reception unit is configured to transmit the third inquiry frame from the first ports.

8. The redundant control device according to claim 5, wherein:
the control unit is configured to allow the transmission and reception unit to regularly transmit the inquiry frame and, when the exchange frame is received from the other redundant control devices, stop transmitting the inquiry frame.

* * * * *